(12) United States Patent
Lin (10) Patent No.: US 11,663,101 B2
(45) Date of Patent: May 30, 2023

(54) SEMICONDUCTOR DEVICE AND OPERATION METHOD THEREOF

(71) Applicant: Nuvoton Technology Corporation, Hsinchu Science Park (TW)

(72) Inventor: Zong-Min Lin, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 34 days.

(21) Appl. No.: 17/529,942

(22) Filed: Nov. 18, 2021

(65) Prior Publication Data
US 2022/0245040 A1 Aug. 4, 2022

(30) Foreign Application Priority Data
Feb. 4, 2021 (TW) .................. 110104152

(51) Int. Cl.
*G06F 11/263* (2006.01)
*G06F 11/27* (2006.01)
(52) U.S. Cl.
CPC ............ *G06F 11/263* (2013.01); *G06F 11/27* (2013.01)
(58) Field of Classification Search
CPC ..... G06F 9/45508; G06F 11/263; G06F 11/27
USPC .................................................. 714/28–31
See application file for complete search history.

(56) References Cited

U.S. PATENT DOCUMENTS

| | | | | |
|---|---|---|---|---|
| 6,094,729 | A * | 7/2000 | Mann .................. | G06F 11/3636 714/33 |
| 7,058,855 | B2 * | 6/2006 | Rohfleisch ....... | G01R 31/31705 714/28 |
| 7,421,384 | B2 * | 9/2008 | Yamada ................ | G06F 11/261 714/28 |
| 7,818,619 | B2 * | 10/2010 | Smolski .............. | G06F 11/3672 714/25 |
| 9,092,570 | B2 * | 7/2015 | Michael .............. | G06F 11/3656 |

(Continued)

FOREIGN PATENT DOCUMENTS

| CN | 100565472 C | 12/2009 |
|---|---|---|
| TW | 201215901 A | 4/2012 |

(Continued)

OTHER PUBLICATIONS

Office Action of TW Application No. 110104152, dated Feb. 23, 2022, 4 pages.

*Primary Examiner* — Joseph R Kudirka
(74) *Attorney, Agent, or Firm* — Muncy, Geissler, Olds & Lowe, P C.

(57) ABSTRACT

A semiconductor device includes a debug port, a first access port, a second access port, a first processing unit, a second processing unit, and an embedded emulator unit. The first access port is coupled to the debug port. The second access port is coupled to the debug port. The first processing unit is coupled to the first access port. The second processing unit is coupled to the second access port. The embedded emulator unit is coupled to the debug port, the first processing unit and the second processing unit. The first processing unit generates a debug instruction to access the embedded emulator unit, so that the embedded emulator unit generates a debug signal. The debug signal is output to the second processing unit through the debug port and the second access port, so as to perform a debug operation on the second processing unit.

18 Claims, 8 Drawing Sheets

(56) References Cited

U.S. PATENT DOCUMENTS

| | | | | |
|---|---|---|---|---|
| 9,703,748 B2* | 7/2017 | Smith | ................ | G06F 13/4226 |
| 10,481,990 B2* | 11/2019 | Eder | ...................... | G06F 11/25 |
| 2003/0120970 A1* | 6/2003 | Chen | ................... | G06F 11/261 |
| | | | | 714/25 |

FOREIGN PATENT DOCUMENTS

| TW | 201426375 A | 7/2014 |
|---|---|---|
| TW | 202032144 A | 9/2020 |

* cited by examiner

SEMICONDUCTOR DEVICE AND OPERATION METHOD THEREOF

CROSS REFERENCE TO RELATED APPLICATIONS

This application claims priority of Taiwan Patent Application No. 110104152, filed on Feb. 4, 2021, the entirety of which is incorporated by reference herein.

TECHNICAL FIELD

The present invention relates to a semiconductor device, and in particular it relates to a semiconductor device and an operation method thereof.

BACKGROUND

In general, after a micro controller unit (MCU) chip is manufactured, a developer needs to debug the micro controller unit, so as to determine whether the state of the micro controller unit is normal. Therefore, how to effectively perform a debug operation on the micro controller unit has become the focus of technical improvements by various manufacturers.

SUMMARY

An embodiment of the present invention provides a semiconductor device and an operation method thereof, so that a processing unit inside the semiconductor device may perform a debug operation on another processing unit, so as to increase the convenience of debug operation and use.

An embodiment of the present invention provides a semiconductor device, which includes a debug port, a first access port, a second access port, a first processing unit, a second processing unit and an embedded emulator unit. The first access port is coupled to the debug port. The second access port is coupled to the debug port. The first processing unit is coupled to the first access port. The second processing unit is coupled to the second access port. The embedded emulator unit is coupled to the debug port, the first processing unit and the second processing unit. The first processing unit generates a debug instruction to access the embedded emulator unit, so that the embedded emulator unit generates a debug signal. The debug signal is output to the second processing unit through the debug port and the second access port, so as to perform a debug operation on the second processing unit.

An embodiment of the present invention provides an operation method of a semiconductor device, which includes the following steps. A debug port is provided. A first access port is provided to couple to the debug port. A second access port is provided to couple to the debug port. A first processing unit is provided to couple to the first access port. A second processing unit is provided to couple to the second access port. An embedded emulator unit is provided to couple to the debug port, the first processing unit and the second processing unit. The first processing unit is used to generate a debug instruction to access the embedded emulator unit, so that the embedded emulator unit generates a debug signal. The debug signal is output to the second processing unit through the debug port and the second access port, so as to perform a debug operation on the second processing unit.

According to the semiconductor device and the operation method thereof disclosed by the present invention, the first processing unit generates the debug instruction to access the embedded emulator unit, so that the embedded emulator unit generates a debug signal, and the debug signal may be output to the second processing unit through the debug port and the second access port, so as to perform a debug operation on the second processing unit. Therefore, the convenience of debug operation and use may be effectively increased.

BRIEF DESCRIPTION OF DRAWINGS

The present invention can be more fully understood by reading the subsequent detailed description and examples with references made to the accompanying drawings, wherein.

DETAILED DESCRIPTION OF DISCLOSED EMBODIMENTS

In each of the following embodiments, the same reference number represents an element or component that is the same or similar.

Figure 1:
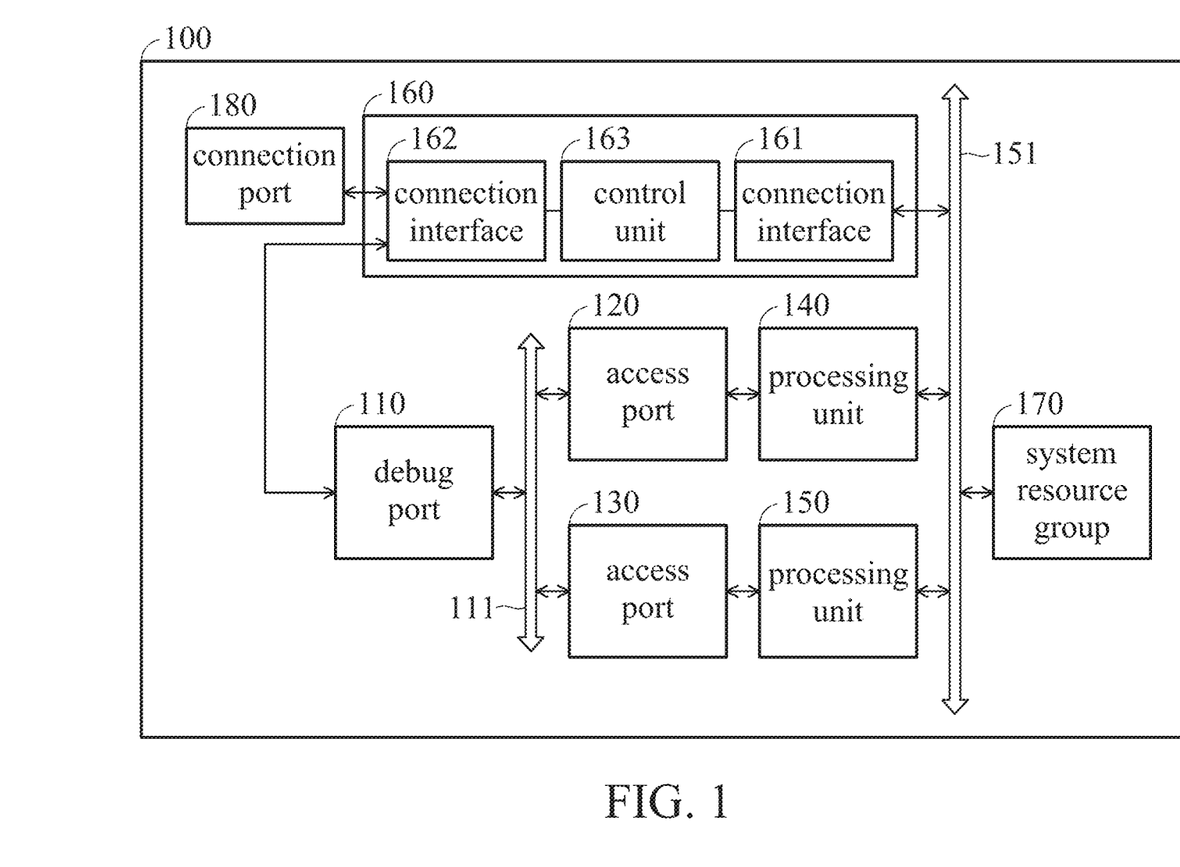
FIG. 1 is a schematic view of a semiconductor device according an embodiment of the present invention.

FIG. 1 is a schematic view of a semiconductor device according an embodiment of the present invention. In the embodiment, the semiconductor device 100 may be an integrated circuit chip, such as a microprocessor chip. The semiconductor device 100 includes a debug port (DP) 110, an access port (AP) 120, an access port 130, a processing unit 140, a processing unit 150 and an embedded emulator unit 160. In an embodiment, the processing unit 140 or the processing unit 150 may be implemented with a single core or multiple cores.

The access port 120 may be coupled to the debug port 110 through a bus 111. The access port 130 may be coupled to the debug port 110 through the bus 111. In the embodiment, the bus 111 is, for example, a debug bus. In addition, the access port 120 and the access port 130 are, for example, memory-mapped access ports or scan-chain access ports, but the embodiment of the present invention is not limited thereto.

The processing unit 140 is coupled to the access port 120. Furthermore, the access port 120 is, for example, coupled to a debug interface of the processing unit 140, but the embodiment of the present invention is not limited thereto. The processing unit 150 is coupled to the access port 130. Furthermore, the access port 130 is, for example, coupled to a debug interface of the processing unit 150, but the embodiment of the present invention is not limited thereto.

The embedded emulator unit 160 is coupled to the processing unit 140, the processing unit 150 and the debug port 110. In the embodiment, the embedded emulator unit 160 may be an embedded in-circuit emulator (Embedded ICE). Furthermore, the embedded emulator unit 160 may be coupled to the processing unit 140 and the processing unit 150 through a bus 151, wherein the bus 151 may be an advanced high-performance bus (AHB) or an advanced eXtensible interface (AXI) or a combination thereof. In addition, the embedded emulator unit 160 may communicate with the debug port 110 through a communication protocol, such as a serial wire debug (SWD) or a joint test action group (JTAG).

In an entire operation, the processing unit 140 may generate a debug instruction (e.g., a debug request) and the debug instruction is transmitted to the embedded emulator unit 160 through the bus 151, and then the processing unit 140 accesses to the embedded emulator unit 160, so that the embedded emulator unit 160 generates a debug signal. Then, the debug signal may be transmitted to the processing unit 150 through the debug port 110, the bus 111, and the access port 130, so as to perform a debug operation on the processing unit 150. Therefore, the semiconductor device 100 may use a processing unit (such as the processing unit 140) to perform a debug operation on another processing unit (such as the processing unit 150), so as to increase the convenience of use.

In addition, the embedded emulator unit 160 may further include a connection interface 161, a connection interface 162 and a control unit 163. The connection interface 161 may be coupled to the processing unit 140 and the processing unit 150 through the bus 151. The connection interface 162 may be coupled to the debug port 110.

The control unit 163 may be coupled between the connection interface 161 and the connection interface 162. The control unit 163 may receive the debug instruction generated by the processing unit 140 through the connection interface 161, convert the debug instruction into a debug signal, and transmit the debug signal to the debug port 110 through the connection interface 162. In the embodiment, the control unit 163 may convert the debug instruction into the debug signal in a direct mapping manner or a communication protocol conversion manner.

In some embodiments, an architecture of the processing unit 140 may be the same as an architecture of the processing unit 150. For example, the processing unit 140 and the processing unit 150 may be Arm Cortex-M series processors, such as Arm Cortex-M4 processors, but the embodiment of the present invention is not limited thereto. In addition, since the architecture of the processing unit 140 is the same as the architecture of the processing unit 150, the embedded emulator unit 160 may use the direct mapping manner to directly map the debug instruction generated by the processing unit 140 to the debug signal, and the debug signal is transmitted to the processing unit 150, so as to perform a debug operation on the processing unit 150.

In some embodiments, the architecture of the processing unit 140 may be different from the architecture of the processing unit 150. For example, the processing unit 140 may be an Arm Cortex-A series processor, such as an Arm Cortex-A35 processor, and the processing unit 150 may be an Arm Cortex-M series processor, such as an Arm Cortex-M4 processor, but the embodiment of the present invention is not limited thereto. In addition, since the architecture of the processing unit 140 is different from the architecture of the processing unit 150, the embedded emulator unit 160 may provide a high-level function, such as a communication protocol conversion. That is, the embedded emulator unit 160 may use the communication protocol conversion manner to convert the debug instruction generated by the processing unit 140 into the debug signal, and the debug signal is transmitted to the processing unit 150, so as to perform a debug operation on the processing unit 150.

In the above embodiment, the processing unit 140 is used to perform a debug operation on the processing unit 150, but the embodiment of the present invention is not limited thereto. In another embodiment, the processing unit 150 may be used to perform a debug operation on the processing unit 140, the debug operation may refer to the description of using the processing unit 140 to perform a debug operation on the processing unit 150, and the description thereof is not repeated herein.

In addition, in FIG. 1, there are two processing units included in the semiconductor device 100, for example, i.e., the processing unit 140 and the processing unit 150, but the embodiment of the present invention is not limited. In some embodiments, there may be three or more processing units included in the semiconductor device 100, and the manner in which the debug operation is performed may be deduced by analogy by referring to the description of the above embodiments, and the description thereof is not repeated herein. Furthermore, the number of access ports may correspond to the number of processing units. For example, when there are two processing units, there are two access ports. When there are three processing units, there are three access ports. The relationship between the number of the rest of the access ports and the rest of the processing units may be deduced by analogy.

In addition, the semiconductor device 100 may include a system resource group 170. The system resource group 170 may be coupled to the processing unit 140 and the processing unit 150 through the bus 151, so that the processing unit 140 and the processing unit 150 may access and control the system resource group. In the embodiment, the system resource group 170 may include, for example, peripheral devices, such as a random access memory (RAM), a read-only memory (ROM), a timer, a system control register, but the embodiment of the present invention is not limited thereto.

Furthermore, the semiconductor device 100 may include a connection port 180. The embedded emulator unit 160 may be coupled to a debug port (not shown) of another semiconductor device (not shown) through the connection port 180 to communicate with the debug port of the another semiconductor device. For example, the semiconductor device 100 may uses the embedded emulator unit 160 to generate the debug signal to the another semiconductor device, so as to perform a debug operation on a processing unit (not shown) of the another semiconductor device.

Figure 2:
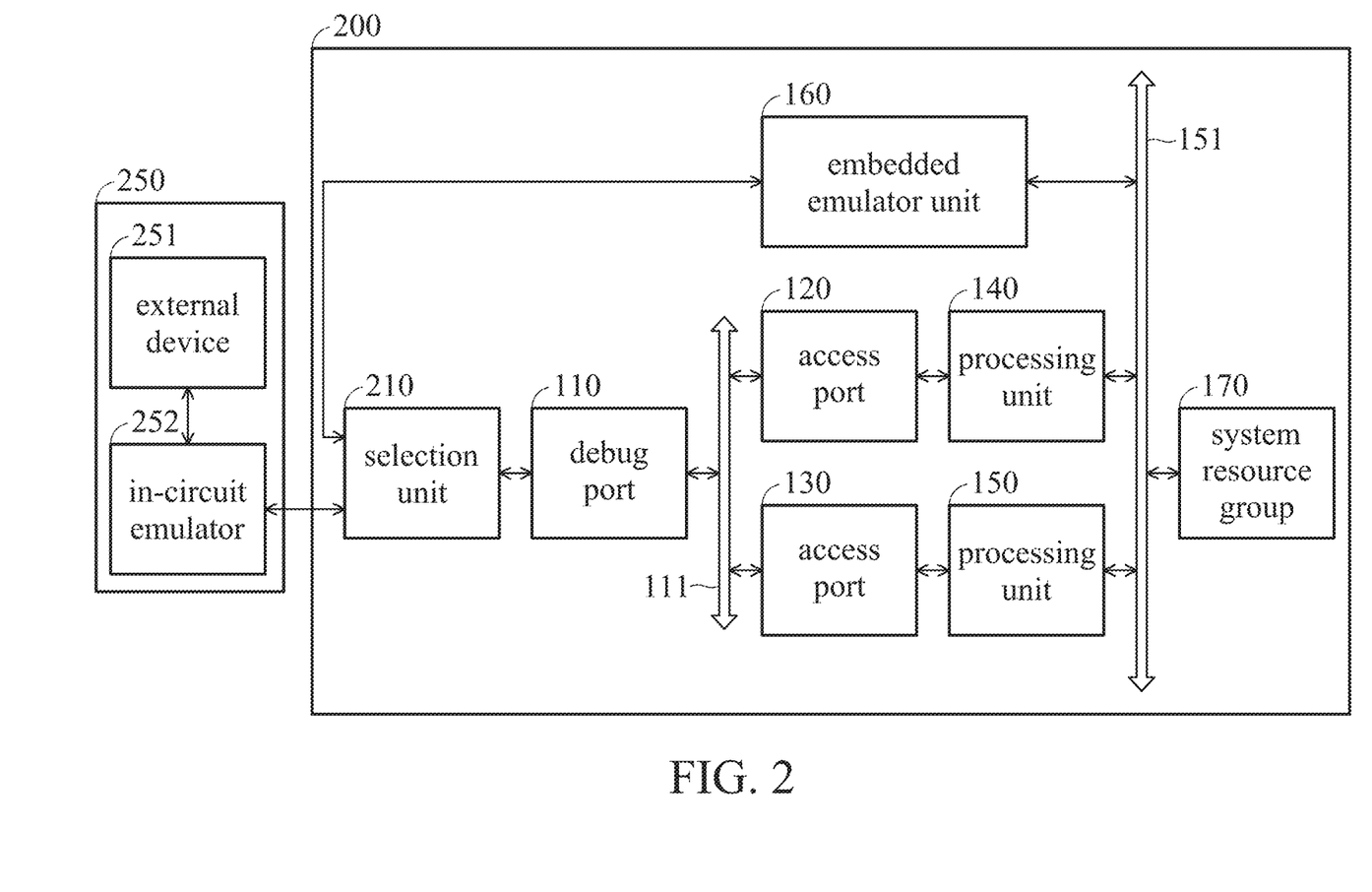
FIG. 2 is a schematic view of a semiconductor device according another embodiment of the present invention.

FIG. 2 is a schematic view of a semiconductor device according another embodiment of the present invention. In the embodiment, the semiconductor device 200 may be an integrated circuit chip, such as a microprocessor chip. The semiconductor device 200 includes a debug port 110, an access port 120, an access port 130, a processing unit 140, a processing unit 150, an embedded emulator unit 160, a system resource group 170 and a selection unit 210. The debug port 110, the access port 120, the access port 130, the processing unit 140, the processing unit 150, the embedded emulator unit 160 and the system resource group 170 in FIG. 2 are the same as or similar to the debut port 110, the access port 120, the access port 130, the processing unit 140, the processing unit 150, the embedded emulator unit 160 and system resource group 170 in FIG. 1. Accordingly, the debug port 110, the access port 120, the access port 130, the processing unit 140, the processing unit 150, the embedded emulator unit 160 and the system resource group 170 in FIG. 2 may be deduced by analogy by referring to the description of the embodiment in FIG. 1, and the description thereof is not repeated herein.

The selection unit 210 is coupled to the debug port 110, the embedded emulator unit 160 and an external debug device 250, and switches the debug port 110 to communicate with the embedded emulator unit 160 or switches the debug port 110 to communicate with the external debug device 250. In the embodiment, the selection unit 210 may be a multiplexer.

Furthermore, the external debug device 250 may include an external device 251 and an in-circuit emulator (ICE) 252. The external device 251 is coupled to the in-circuit emulator 252. In the embodiment, the external device 251 may be a personal computer (PC), and the external device 251 may serve as a debug host.

In addition, the in-circuit emulator 252 (the external debug device 250) may communicate with the debug port 110 through the communication protocol, such as the serial wire debug or the joint test action group. That is, the external device 251 may generate the debug instruction to access the in-circuit emulator 252, so that the in-circuit emulator 252 generates a debug signal. Then, the debug signal passes through the selection unit 210, the debug port 110, the access port 120 to the processing unit 140 to perform a debug operation on the processing unit 140, or the debug signal passes through the selection unit 210, the debug port 110, the access port 130 to the processing unit 150 to perform a debug operation on the processing unit 150.

Therefore, the semiconductor device 200 may use an internal processing unit (such as the processing unit 140) to perform a debug operation on another processing unit (such as the processing unit 150), and may also use the external debug device 250 to perform a debug operation on the processing unit 140 or the processing unit 150, so as to increase the convenience of debug operation and use.

Figure 3:
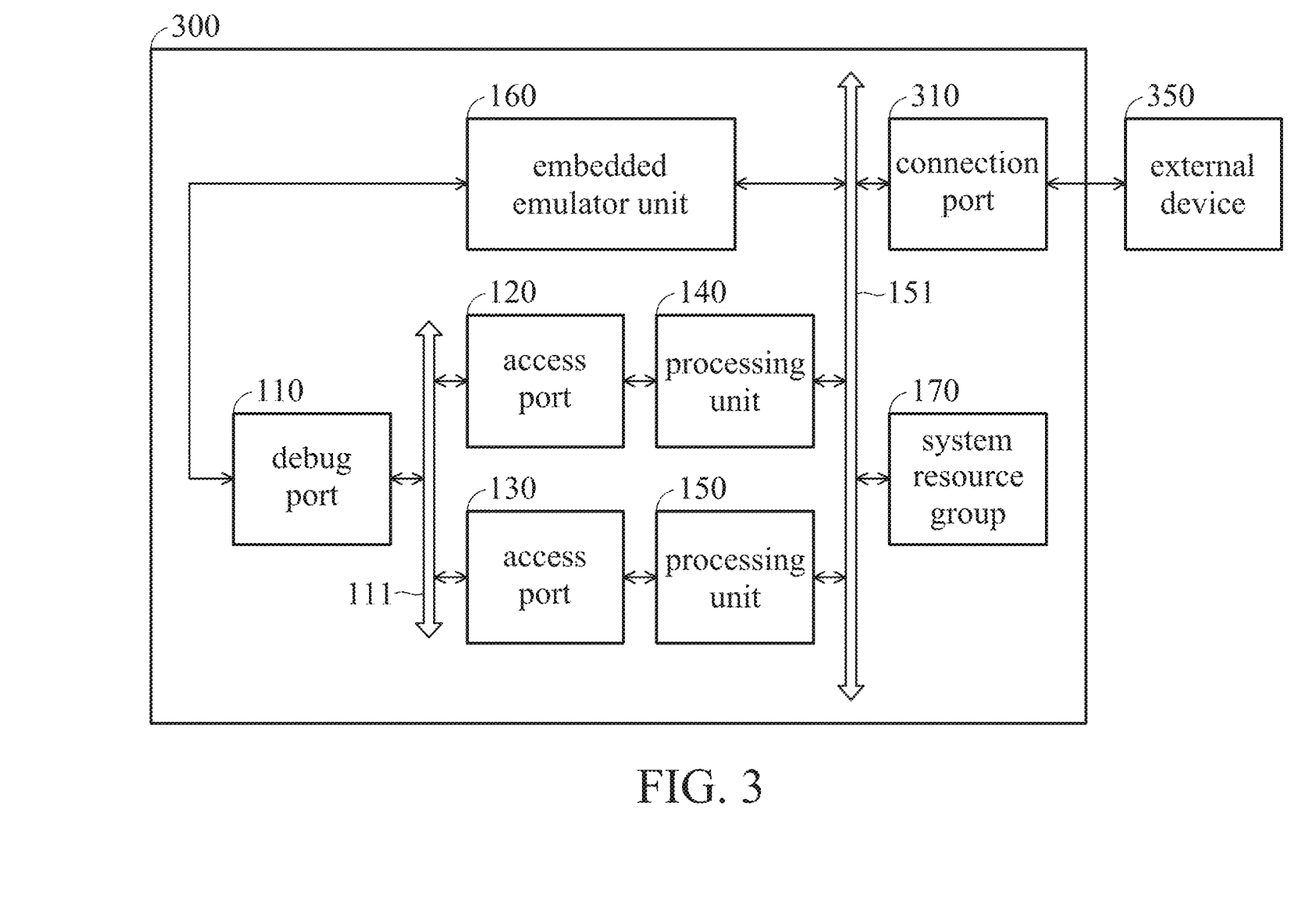
FIG. 3 is a schematic view of a semiconductor device according another embodiment of the present invention.

FIG. 3 is a schematic view of a semiconductor device according another embodiment of the present invention. In the embodiment, the semiconductor device 300 may be an integrated circuit chip, such as a microprocessor chip. The semiconductor device 300 includes a debug port 110, an access port 120, an access port 130, a processing unit 140, a processing unit 150, an embedded emulator unit 160, a system resource group 170 and the connection port 310. The debug port 110, the access port 120, the access port 130, the processing unit 140, the processing unit 150, the embedded emulator unit 160 and the system resource group 170 in FIG. 3 are the same as or similar to the debut port 110, the access port 120, the access port 130, the processing unit 140, the processing unit 150, the embedded emulator unit 160 and system resource group 170 in FIG. 1. Accordingly, the debug port 110, the access port 120, the access port 130, the processing unit 140, the processing unit 150, the embedded emulator unit 160 and the system resource group 170 in FIG. 3 may be deduced by analogy by referring to the description of the embodiment in FIG. 1, and the description thereof is not repeated herein.

The connection port 310 may be coupled to the processing unit 140, the processing unit 150, the embedded emulator unit 160 and an external device 350. Furthermore, the connection port 310 may be coupled to the processing unit 140, the processing unit 150 and the embedded emulator unit 160 through the bus 151. In the embodiment, the connection port 310 may be a universal series bus (USB), but the embodiment of the present invention is not limited thereto. In addition, the external device 350 may be a personal computer, and the external device 350 may serve as a debug host.

The external device 350 may communicate with the processing unit 140 and the processing unit 150 and perform the data transmission through the connection port 310 and the bus 151. In addition, the external device 350 may also generate the debug instruction to the embedded emulator unit 160 to assess the embedded emulator unit 160, so that the embedded emulator unit 160 generates a debug signal. Then, the debug signal may be transmitted to the processing unit 140 through the debug port 110 and the access port 120, so as to perform a debug operation on the processing unit 140, or the debug signal may be transmitted to the processing unit 150 through the debug port 110 and the access port 130, so as to perform a debug operation on the processing unit 150.

Therefore, the semiconductor device 300 may use an internal processing unit (such as the processing unit 140) to perform a debug operation on another processing unit (such as the processing unit 150), and may also use the external device 350 and the embedded emulator unit 160 to perform a debug operation on the processing unit 140 or the processing unit 150, so as to increase the convenience of debug operation and use.

Figure 4:
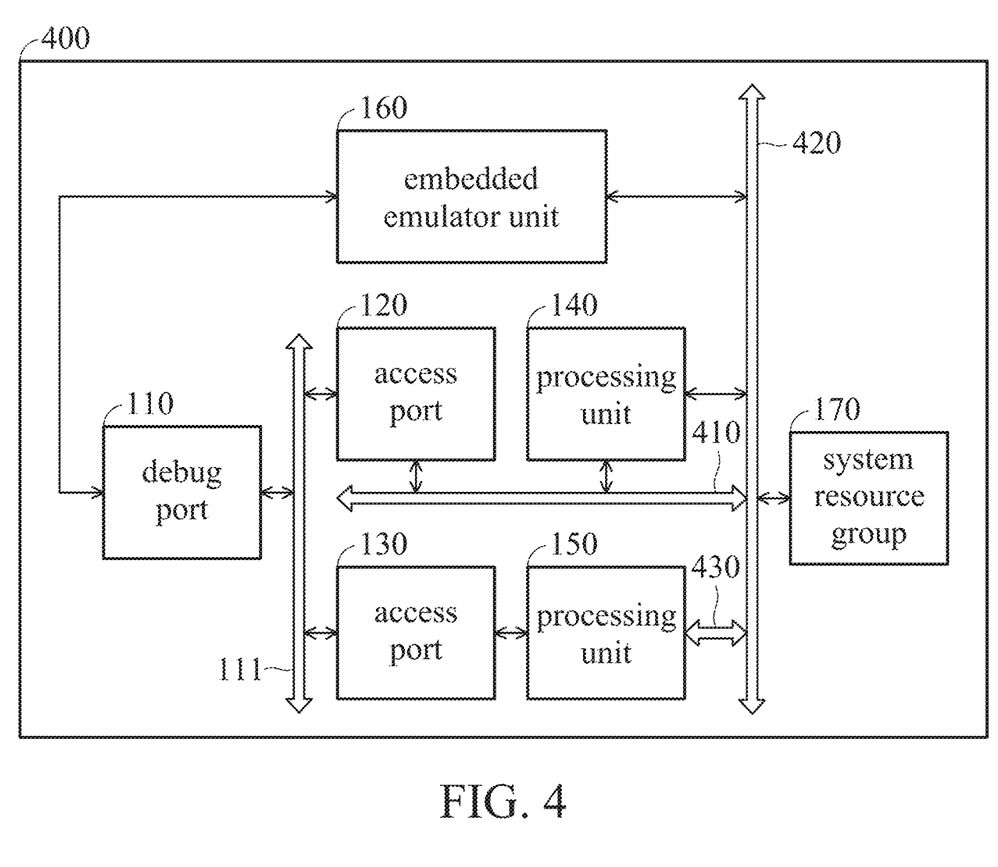
FIG. 4 is a schematic view of a semiconductor device according another embodiment of the present invention.

FIG. 4 is a schematic view of a semiconductor device according another embodiment of the present invention. In the embodiment, the semiconductor device 400 may be an integrated circuit chip, such as a microprocessor chip. The semiconductor device 400 includes a debug port 110, an access port 120, an access port 130, a processing unit 140, a processing unit 150, an embedded emulator unit 160 and a system resource group 170. The debug port 110, the access port 120, the access port 130 and the system resource group 170 in FIG. 4 are the same as or similar to the debut port 110, the access port 120, the access port 130 and the system resource group 170 in FIG. 1. Accordingly, the debug port 110, the access port 120, the access port 130 and the system resource group 170 in FIG. 4 may be deduced by analogy by referring to the description of the embodiment in FIG. 1, and the description thereof is not repeated herein.

In the embodiment, the architecture of the processing unit 140 may be different from the architecture of the processing unit 150. For example, the processing unit 140 may be an Arm Cortex-A series processor, such as an Arm Cortex-A35 processor, and the processing unit 150 may be an Arm Cortex-M series processor, such as an Arm Cortex-M4 processor, but the embodiment of the present invention is not limited thereto.

The processing unit 140 may be coupled to the access port 120 through a bus 410. In the embodiment, the bus 410 may be an advanced peripheral bus (APB). In addition, the processing unit 140 may be coupled to the embedded emulator unit 160 through the bus 420. In the embodiment, the bus 420 may be an advanced eXtensible interface. Furthermore, the bus 420 may be coupled to the bus 410. The processing unit 150 may be coupled to the embedded emulator unit 160 through a bus 430 and the bus 420. In the embodiment, the bus 430 may be an advanced high-performance bus.

In the embodiment, the processing unit 140 may serve as the debug host, and the processing unit 140 may perform a debug operation on itself. For example, the processing unit 140 may generate the debug instruction, and the debug instruction may be output to the processing unit 140 (such as a debug interface of the processing unit 140) through the bus 420 and the bus 410, so as to perform a debug operation on the processing unit 140.

In addition, the processing unit 140 may also generate the debug instruction to the embedded emulator unit 160 to access the embedded emulator unit 160, so that the embedded emulator unit 160 generates a debug signal. Then, the debug signal may be transmitted to the processing unit 150 through the debug port 110 and the access port 130, so as to perform a debug operation on the processing unit 150.

Therefore, the processing unit 140 may perform a debug operation on itself, and the processing unit 140 may also be used with the embedded emulator unit 160 to perform a debug operation on the processing unit 150, so as to increase the convenience of debug operation and use.

Figure 5:
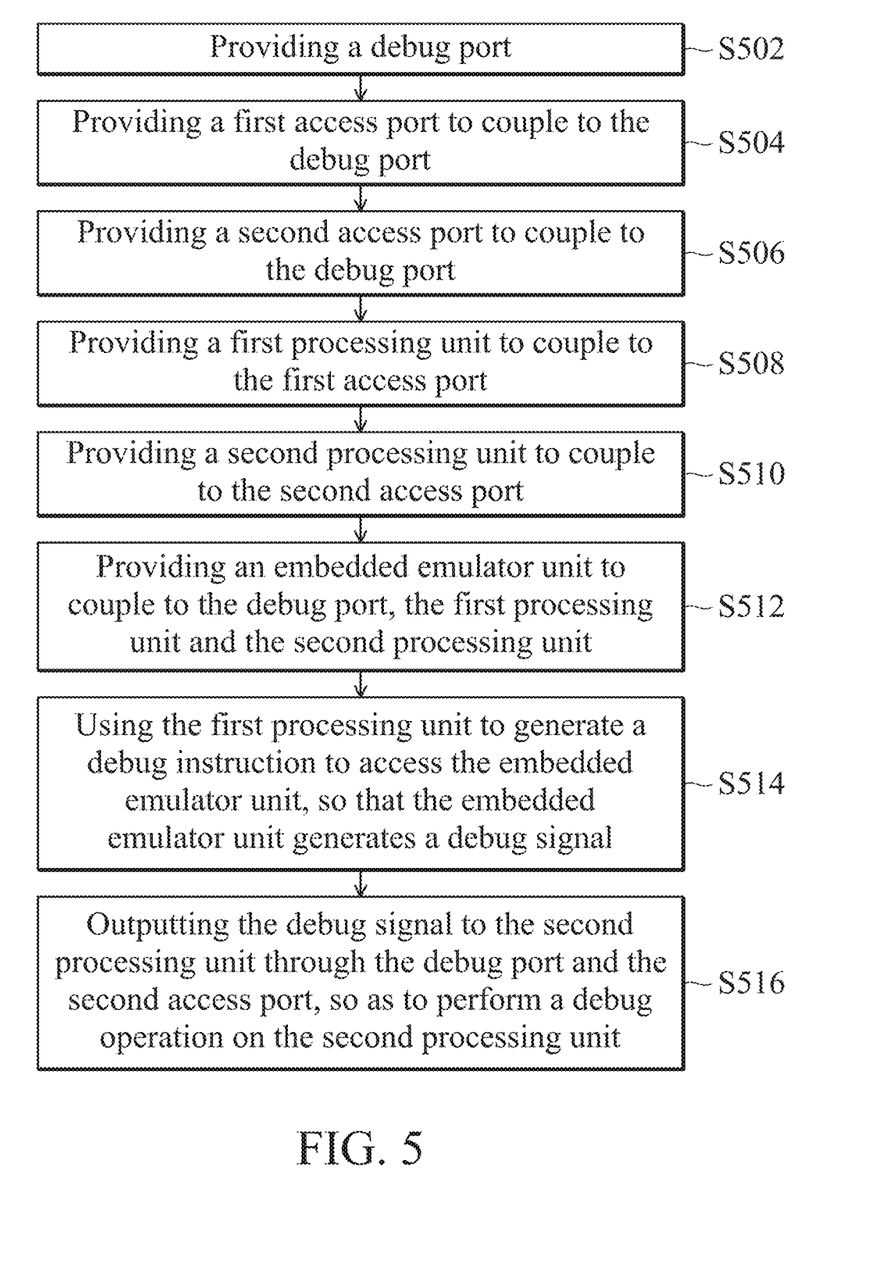
FIG. 5 is a flowchart of an operation method of a semiconductor device according an embodiment of the present invention.

According to the above-mentioned description, the embodiment of the present invention additionally provides an operation method of a semiconductor device. FIG. 5 is a flowchart of an operation method of a semiconductor device according an embodiment of the present invention. In step S502, the method involves providing a debug port. In step 504, the method involves providing a first access port to couple to the debug port. In step S506, the method involves providing a second access port to couple to the debug port. In step S508, the method involves providing a first processing unit to couple to the first access port. In step S510, the method involves providing a second processing unit to couple to the second access port. In step S512, the method involves providing an embedded emulator unit to couple to the debug port, the first processing unit and the second processing unit. In step S514, the method involves using the first processing unit to generate a debug instruction to access the embedded emulator unit, so that the embedded emulator unit generates a debug signal. In step S516, the method involves outputting the debug signal to the second processing unit through the debug port and the second access port, so as to perform a debug operation on the second processing unit. In some embodiments, an architecture of the processing unit 140 may be the same as an architecture of the processing unit 150. In some embodiments, the architecture of the processing unit 140 may be different from the architecture of the processing unit 150. In addition, the first processing unit may serve as a debug host. Furthermore, the first processing unit may perform a debug operation on itself.

Figure 6:
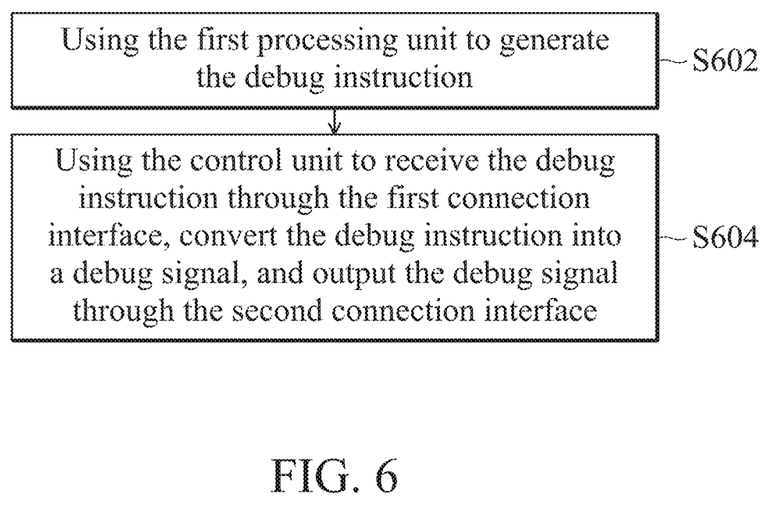
FIG. 6 is a detailed flowchart of step S514 in FIG. 5.

FIG. 6 is a detailed flowchart of step S514 in FIG. 5. In step S602, the method involves using the first processing unit to generate the debug instruction. In step S604, the method involves using the control unit to receive the debug instruction through the first connection interface, convert the debug instruction into a debug signal, and output the debug signal through the second connection interface. In the embodiment, the control unit converts the debug instruction into the debug signal in a direct mapping manner or by communication protocol conversion.

Figure 7:
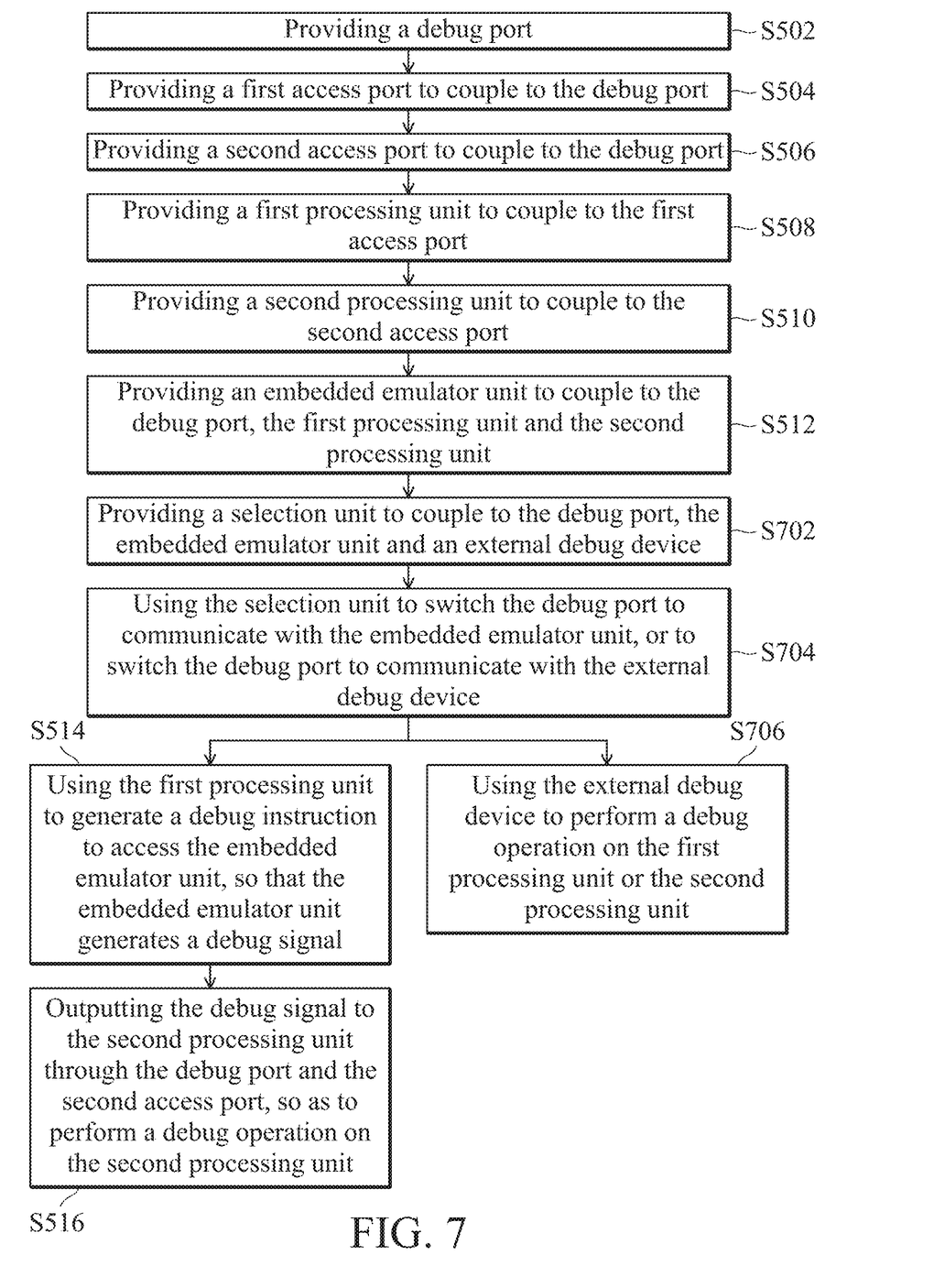
FIG. 7 is a flowchart of an operation method of a semiconductor device according another embodiment of the present invention.

FIG. 7 is a flowchart of an operation method of a semiconductor device according another embodiment of the present invention. In the embodiment, steps S502~S516 in FIG. 7 are the same as or similar to steps S502~S516 in FIG. 5. Accordingly, steps S502~S516 in FIG. 7 may refer to the description of the embodiment in FIG. 5, and the description thereof is not repeated herein.

In step S702, the method involves providing a selection unit to couple to the debug port, the embedded emulator unit and an external debug device. In step S704, the method involves using the selection unit to switch the debug port to communicate with the embedded emulator unit, or to switch the debug port to communicate with the external debug device. In step S706, the method involves using the external debug device to perform a debug operation on the first processing unit or the second processing unit.

Figure 8:
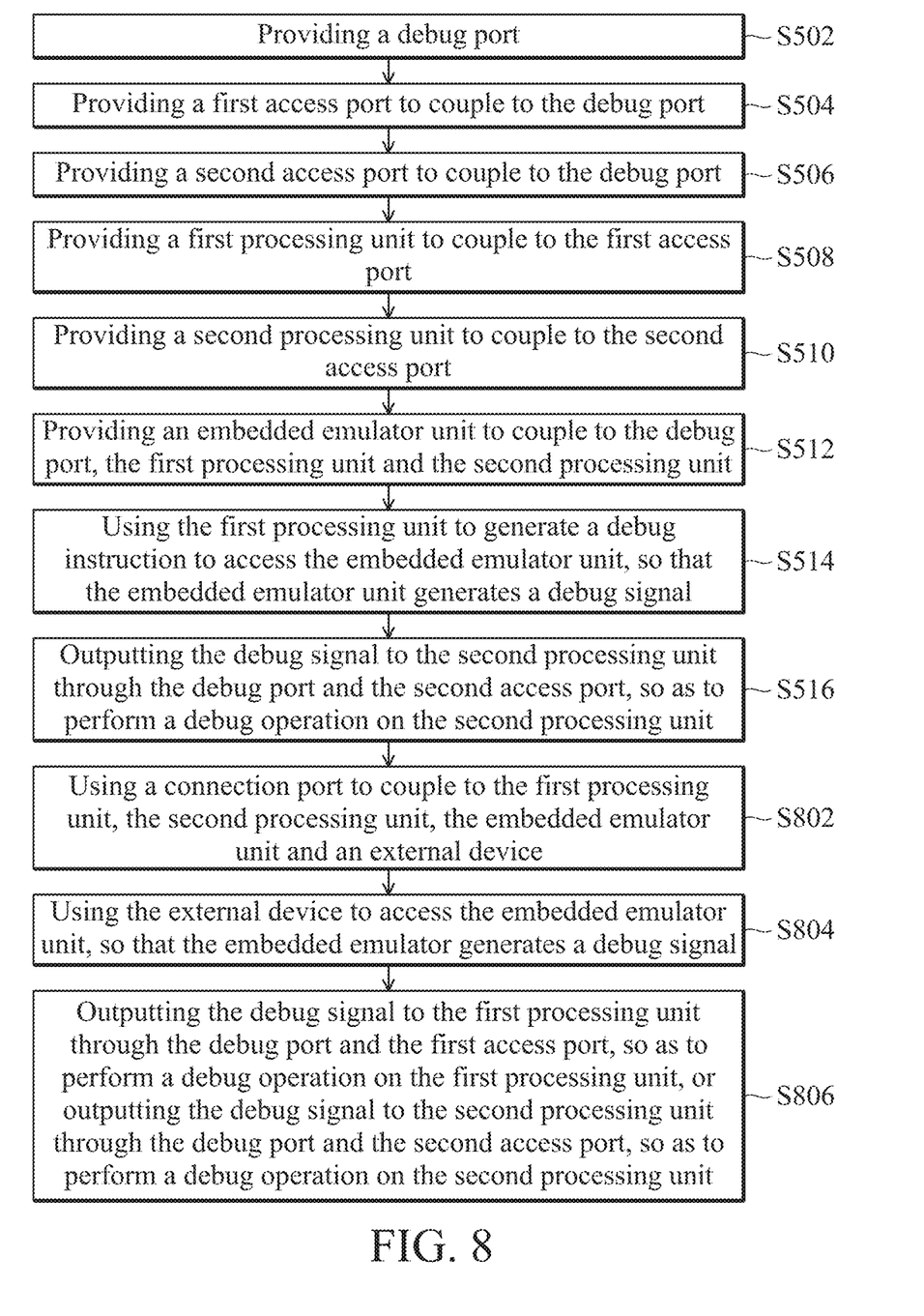
FIG. 8 is a flowchart of an operation method of a semiconductor device according another embodiment of the present invention.

FIG. 8 is a flowchart of an operation method of a semiconductor device according another embodiment of the present invention. In the embodiment, steps S502~S516 in FIG. 8 are the same as or similar to steps S502~S516 in FIG. 5. Accordingly, steps S502~S516 in FIG. 7 may refer to the description of the embodiment in FIG. 5, and the description thereof is not repeated herein.

In step S802, the method involves using a connection port to couple to the first processing unit, the second processing unit, the embedded emulator unit and an external device. In step S804, the method involves using the external device to access the embedded emulator unit, so that the embedded emulator generates a debug signal. In step S806, the method involves outputting the debug signal to the first processing unit through the debug port and the first access port, so as to perform a debug operation on the first processing unit, or outputting the debug signal to the second processing unit through the debug port and the second access port, so as to perform a debug operation on the second processing unit.

It should be noted that the order of the steps of FIG. 5, FIG. 6, FIG. 7 and FIG. 8 is only for illustrative purpose, but not intended to limit the order of the steps of the present invention. The user may change the order of the steps above according the requirement thereof. The flowcharts described above may add additional steps or use fewer steps without departing from the spirit and scope of the present invention.

In summary, according to the semiconductor device and the operation method thereof disclosed by the embodiment of the present invention, the first processing generates the debug instruction to access the embedded emulator unit, so that the embedded emulator unit generates a debug signal, and the debug signal may be output to the second processing unit through the debug port and the second access port, so as to perform a debug operation on the second processing unit. The embodiment of the present invention further includes the selection unit, the selection unit may be coupled to the external debug device and the embedded emulator unit, and thus the embodiment of the present invention may use the internal first processing unit to perform a debug operation on the second processing unit, and may also use the external debug external to perform a debug operation on the first processing unit or the second processing unit.

Furthermore, the embodiment of the present invention further includes the connection port, the connection port may be coupled to the external device and the embedded emulator unit, and thus the embodiment of the present invention may use the internal first processing unit to perform a debug operation on the second processing unit, and may also use the external device and the embedded emulator unit to perform a debug operation on the first processing unit or the second processing unit. Moreover, the architecture of the first processing unit is different from the architecture of the second processing unit, the first processing unit may serve as the debug host, and thus the first processing unit may perform a debug operation on itself or the first processing unit may perform a debug operation on the second processing unit. Therefore, the convenience of debug operation and use may be effectively increased.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art).

Therefore, the scope of the appended claims should be accorded the broadest interpretation to encompass all such modifications and similar arrangements.

What is claimed is:

1. A semiconductor device, comprising:
a debug port;
a first access port, coupled to the debug port;
a second access port, coupled to the debug port;
a first processing unit, coupled to the first access port;
a second processing unit, coupled to the second access port; and
an embedded emulator unit, coupled to the debug port, the first processing unit and the second processing unit;
wherein the first processing unit generates a debug instruction to access the embedded emulator unit, such that the embedded emulator unit generates a debug signal, and the debug signal is output to the second processing unit through the debug port and the second access port, so as to perform a debug operation on the second processing unit.

2. The semiconductor device as claimed in claim 1, further comprising:
a selection unit, coupled to the debug port, the embedded emulator unit and an external debug device, wherein the selection unit switches the debug port to communicate with the embedded emulator unit or switches the debug port to communicate with the external debug device, such that the external debug device performs the debug operation on the first processing unit or the second processing unit.

3. The semiconductor device as claimed in claim 1, wherein an architecture of the first processing unit is the same as an architecture of the second processing unit.

4. The semiconductor device as claimed in claim 1, further comprising:
a connection port, coupled to the first processing unit, the second processing unit, the embedded emulator unit and an external device;
wherein the external device accesses the embedded emulator unit, such that the embedded emulator generates the debug signal, and the debug signal is output to the first processing unit through the debug port and the first access port, so as to perform the debug operation on the first processing unit, or the debug signal is output to the second processing unit through the debug port and the second access port, so as to perform the debug operation on the second processing unit.

5. The semiconductor device as claimed in claim 1, wherein an architecture of the first processing unit is different from an architecture of the second processing unit.

6. The semiconductor device as claimed in claim 5, wherein the first processing unit serves as a debug host.

7. The semiconductor device as claimed in claim 6, wherein the first processing unit performs the debug operation on itself.

8. The semiconductor device as claimed in claim 1, wherein the embedded emulator unit comprises:
a first connection interface;
a second connection interface; and
a control unit, coupled between the first connection interface and the second connection interface, wherein the control unit receives the debug instruction through the first connection interface and converts the debug instruction into the debug signal, and the debug signal is output through the second connection interface.

9. The semiconductor device as claimed in claim 8, wherein the control unit converts the debug instruction into the debug signal in a direct mapping manner or a communication protocol conversion.

10. An operation method of a semiconductor device, comprising:
providing a debug port;
providing a first access port to couple to the debug port;
providing a second access port to couple to the debug port;
providing a first processing unit to couple to the first access port;
providing a second processing unit to couple to the second access port;
providing an embedded emulator unit to couple to the debug port, the first processing unit and the second processing unit;
using the first processing unit to generate a debug instruction to access the embedded emulator unit, such that the embedded emulator unit generates a debug signal; and
outputting the debug signal to the second processing unit through the debug port and the second access port, so as to perform a debug operation on the second processing unit.

11. The operation method of the semiconductor device as claimed in claim 10, further comprising:
providing a selection unit to couple to the debug port, the embedded emulator unit and an external debug device;
using the selection unit to switch the debug port to communicate with the embedded emulator unit or to switch the debug port to communicate with the external debug device; and
using the external debug device to perform the debug operation on the first processing unit or the second processing unit.

12. The operation method of the semiconductor device as claimed in claim 10, wherein an architecture of the first processing unit is the same as an architecture of the second processing unit.

13. The operation method of the semiconductor device as claimed in claim 10, further comprising:
using a connection port to couple to the first processing unit, the second processing unit, the embedded emulator unit and an external device;
using the external device to access the embedded emulator unit, such that the embedded emulator generates the debug signal; and
outputting the debug signal to the first processing unit through the debug port and the first access port, so as to perform the debug operation on the first processing unit, or outputting the debug signal to the second processing unit through the debug port and the second access port, so as to perform the debug operation on the second processing unit.

14. The operation method of the semiconductor device as claimed in claim 10, wherein an architecture of the first processing unit is different from an architecture of the second processing unit.

15. The operation method of the semiconductor device as claimed in claim 14, wherein the first processing unit serves as a debug host.

16. The operation method of the semiconductor device as claimed in claim 15, wherein the first processing unit performs the debug operation on itself.

17. The operation method of the semiconductor device as claimed in claim 10, wherein the embedded emulator unit generating the debug signal comprises:

using a control unit to receive the debug instruction through a first connection interface, convert the debug instruction into the debug signal, and output the debug signal through a second connection interface.

18. The operation method of the semiconductor device as claimed in claim 17, wherein the control unit converts the debug instruction into the debug signal in a direct mapping manner or a communication protocol conversion.

* * * * *